No. 771,194. PATENTED SEPT. 27, 1904.
T. B. WILLIAMS.
VALVE RESEATING DEVICE.
APPLICATION FILED APR. 25, 1904.
NO MODEL. 2 SHEETS—SHEET 1.
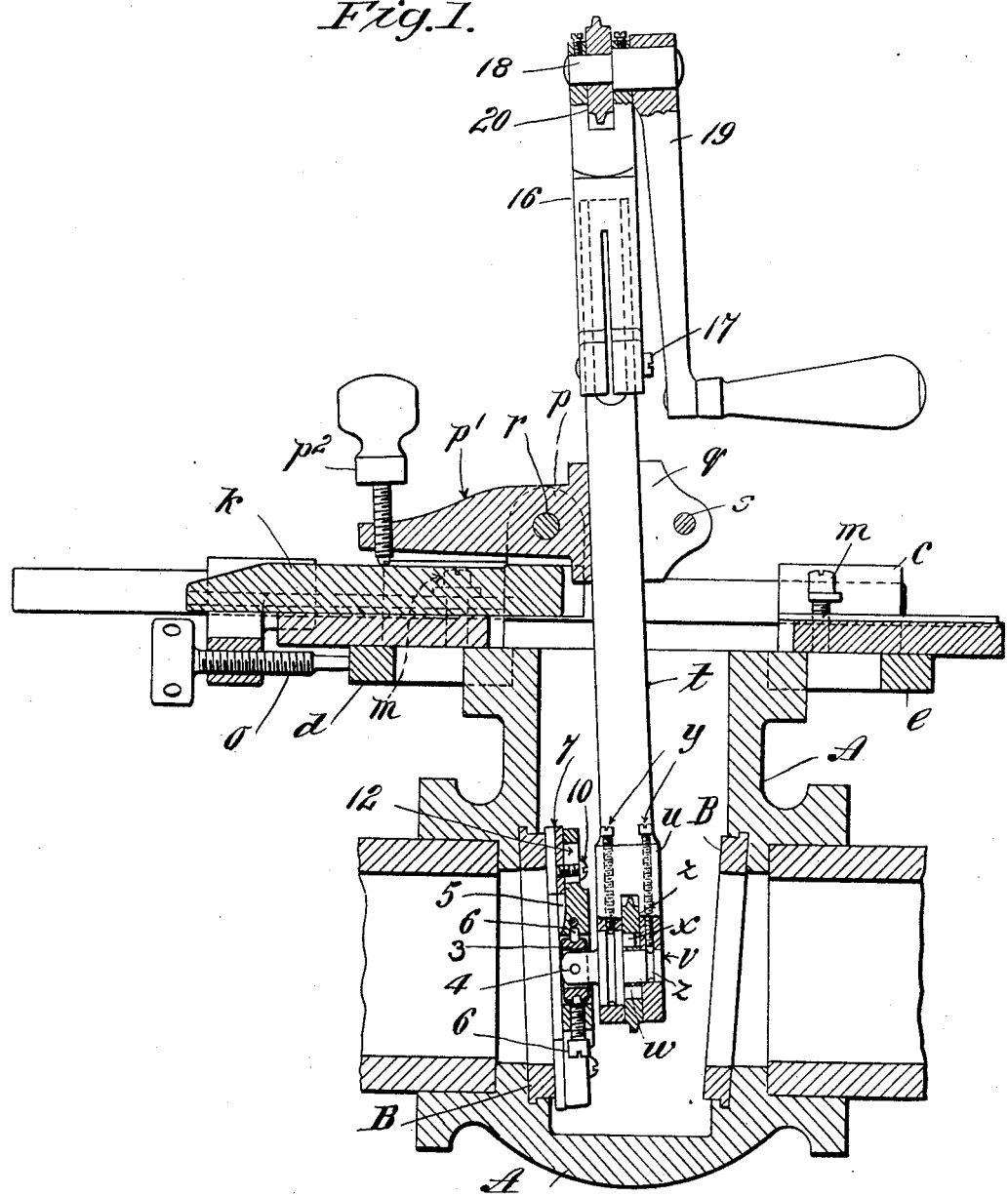
Fig. I.
Witnesses:
J. H. Garfield
H. I. Clemons
Inventor,
Thomas B. Williams
by Chapin & Lea
Attorneys.

No. 771,194. PATENTED SEPT. 27, 1904.
T. B. WILLIAMS.
VALVE RESEATING DEVICE.
APPLICATION FILED APR. 25, 1904.
NO MODEL. 2 SHEETS—SHEET 2.
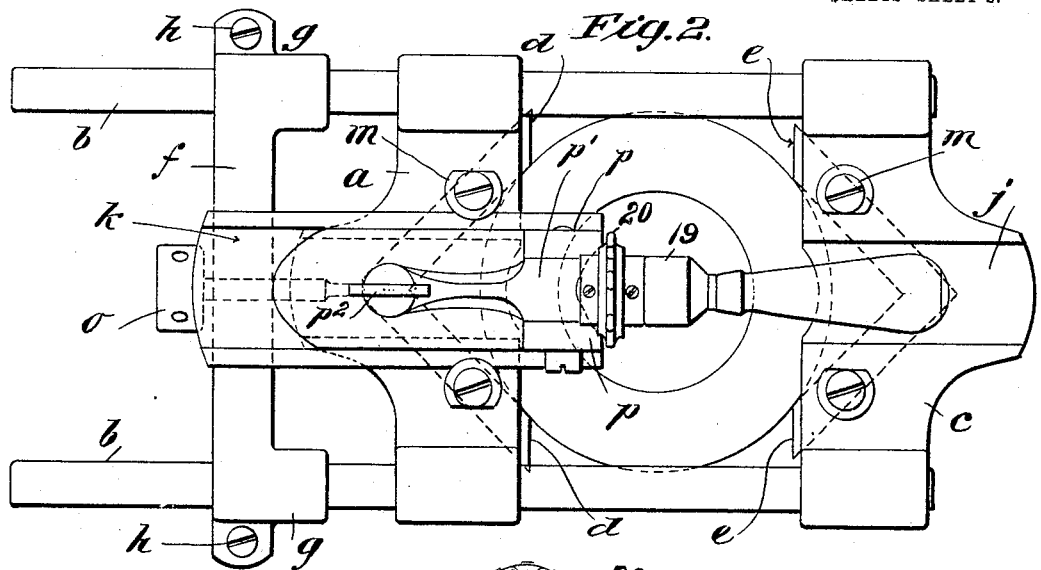
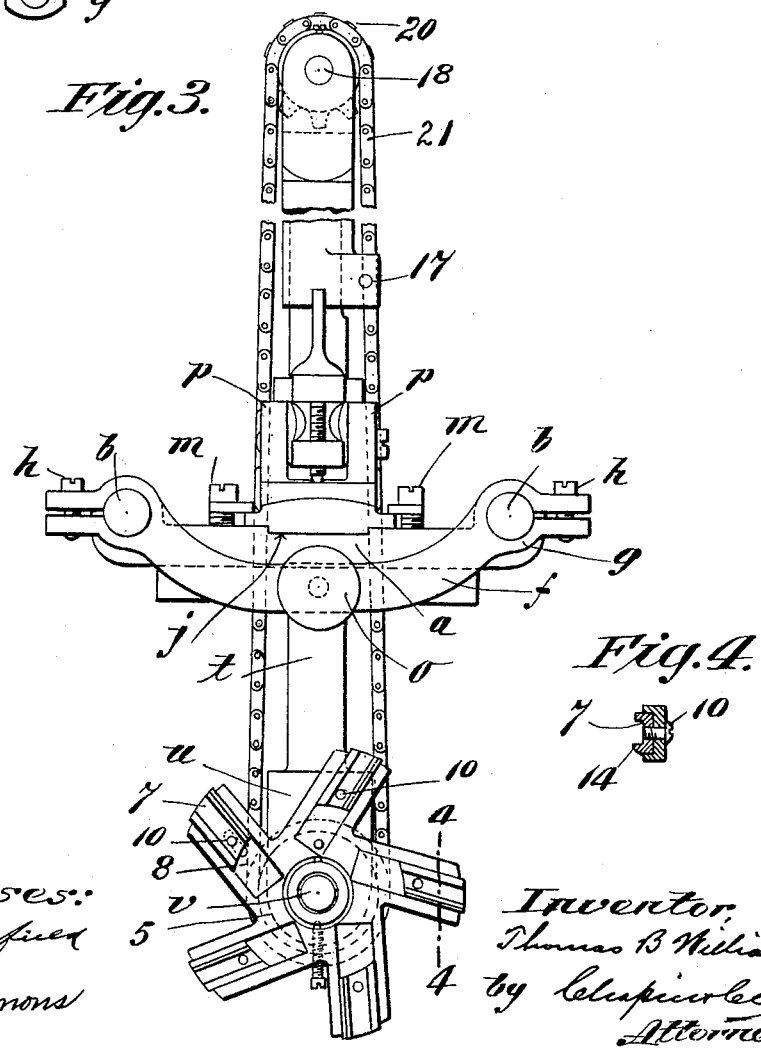
Witnesses:
Inventor,
Thomas B Williams
by
Attorneys.

No. 771,194. Patented September 27, 1904.

UNITED STATES PATENT OFFICE.

THOMAS B. WILLIAMS, OF ORANGE, MASSACHUSETTS, ASSIGNOR TO THE LEAVITT MACHINE COMPANY, OF ORANGE, MASSACHUSETTS, A CORPORATION.

VALVE-RESEATING DEVICE.

SPECIFICATION forming part of Letters Patent No. 771,194, dated September 27, 1904.

Application filed April 25, 1904. Serial No. 204,806. (No model.)

*To all whom it may concern:*

Be it known that I, THOMAS B. WILLIAMS, a citizen of the United States of America, residing at Orange, in the county of Franklin and State of Massachusetts, have invented new and useful Improvements in Valve-Reseating Devices, of which the following is a specification.

This invention relates to valve-reseating machines; and it is especially adapted for use in reseating gate-valves of relatively small diameter without removing the same from the lines of pipe in which they are located, the object of the invention being to provide a reseating mechanism whereby the face of the two annular seats in the valve-body may be turned off at the same angle relative to a vertical plane without removing the valve-body from its situation in the line of pipe.

The invention consists in the mechanism fully described in the following specification and summarized in the claims forming a part thereof.

In the drawings forming part of this application, Figure 1 is a sectional elevation of the reseating mechanism embodying this invention, showing the same applied to the valve-body, certain parts of the mechanism being shown in elevation. Fig. 2 is a plan view of the mechanism shown in Fig. 1. Fig. 3 is an end elevation of the mechanism shown in Fig. 1 looking from left to right. Fig. 4 is a transverse section on line 4 4, Fig. 3.

Referring to the drawings, $a$ indicates a sliding head supported on two rods $b$, which are secured by one end in a fixed head $c$, the head $a$ sliding on these rods toward and from the head $c$. Secured to the under side of the head $a$ is a rigid V-shaped jaw $d$, and secured to the under side of the head $c$ is another similar jaw, $e$.

A yoke $f$ is mounted to slide on the rods $b$ between the free ends thereof and the head $a$, each end of this yoke being provided with a longitudinally-split bearing $g$, through which the rods $b$ pass, said bearings having the screws $h$ therein, whereby the yoke may be rigidly secured in any adjusted position on the rods relative to the head $a$. Both of the heads $a$ and $c$ have planed in their upper surfaces a centrally and longitudinally disposed shallow groove $j$, having parallel sides, that in the head $c$ showing clearly in Fig. 2 and that in the head $a$ being shown in end elevation in Fig. 3. These grooves are to receive the sliding carriage $k$, which may be mounted interchangeably on either the fixed or the movable head. Means are provided, as the bolts $m$, whereby this carriage when properly adjusted in either head may be secured hereto.

In the yoke $f$ is a screw $o$, horizontally disposed with its point arranged to bear against the end of the movable head $a$, or, more specifically, as shown in Fig. 1, against the end of the jaw $d$, which is secured to said head. The object of this screw is to secure the reseating device to the end of the valve A from which the cap or bonnet has been removed. In the smaller valves, to which this device is especially adapted, the ends to which the caps or bonnets are fitted are usually either circular or of hexagon shape, and in either case the jaws $d$ and $e$ will fit the end.

When it is desired to secure the reseating device thereto, it is adjusted to bring the jaw $e$ against one side of the end of the valve, and the movable head $a$ is then slid along the rods $b$ to bring the jaw $d$ against the opposite side. Then the yoke $f$ is moved up toward the head $a$ until the end of the screw $o$ comes to a bearing thereon, the yoke $f$ being secured to the rods by tightening the screws $h$. The screw $o$ may now be turned up to cause the top of the valve to be tightly gripped between the jaws $d$ and $e$.

On the movable head $a$ are two upstanding ears $p$, between which there is mounted to swing in a vertical plane an arm $p'$, having a split sleeve $q$ on one end thereof. This arm $p'$ extends longitudinally of the head on which it may be mounted, and there is a screw $p^2$ extending transversely through the end of the arm and adapted to bear on the head, whereby said arm may be adjusted in a vertical plane swinging on the pin $r$, passing through it and the ears $p$. This screw constitutes a feed-screw. In this sleeve $q$ is a screw $s$, whereby the arm $t$, passing through the sleeve, may be rigidly clamped therein. This arm consists of a round bar having on the lower end thereof a flat head $u$, in which is secured a rotatable stud $v$. (Shown most clearly in Fig. 1.) This head $u$ is slotted in a plane parallel with the flat sides thereof, in which slot the sprocket-wheel $w$ is located, which engages with the stud $v$ in any suitable manner (preferably in the manner shown) by means of pins $x$ parallel with the axis of the stud and inserted in an enlarged part thereof to engage with holes in the sprocket made to receive them. To secure the stud in this head $u$, two screws $y$ are provided, which are adapted to enter grooves $z$, turned in the surface of the stud, thus permitting the latter to be removed upon loosening the screws and at the same time permitting the stud to rotate. One end of this stud projects beyond the surface of the head and has mounted thereon a loose ring 3 by means of a horizontal pin 4, and on this ring a star-wheel 5 is supported on vertically-disposed axes 6. This construction provides means to swing the star-wheel within certain limits in any direction. As shown in Fig. 3, the arms of this wheel 5 are not radial to the axis thereof, but are inclined to the radius of the wheel, as shown, to the end that the cutters 7, mounted in the arms of said wheel, may have a shearing cut. The arms of this star-wheel have grooves 8 milled therein parallel with the sides of the arm, as shown in Fig. 3 and also in section in Fig. 4, in which grooves the cutters 7 are secured by means of a screw 10, which extends through slots 12 in said arms. This will permit the cutters to be moved endwise in the arms of the wheel 5, whereby they may be adjusted to operate on the annular valve-seats of different diameters, these seats being indicated by B, Fig. 1.

It will be observed that one edge 14 of the cutters is the cutting edge, and the opposite edge of the cutter is flat and not quite as high as the cutting edge. The flat edge is intended to serve as a gage whereby only as much metal may be removed from the valve-seat B as will equal the difference in height between the cutting edge 14 and the opposite flat edge of the cutters, these latter being trough-shaped in cross-section, as shown in Fig. 4.

The arm $t$ extends through the sleeve $q$ and above the latter, and on the upper end of the arm is fitted a sleeve 16, which is split longitudinally and is provided at its lower end with a tightened screw 17, whereby it may be clamped securely to the arm $t$ when properly adjusted. This sleeve is movable endwise on the arm $t$, and a suitable head is formed on the upper end thereof, in which is a transversely-located stud 18, extending through said head and beyond one side thereof far enough to permit the crank 19 to be secured thereto. The head of the sleeve is slotted in the same manner as the lower end of the arm $t$, and a sprocket-wheel 20 is located in the slot and secured to the stud 18. A suitable chain 21 (shown in Fig. 3 only) passes over the sprocket-wheels 20 and $w$, whereby the rotation of the crank will rotate the star-wheel 5 and its cutters.

The operation of this machine is as follows: The cutters 7 of the wheel 5 are first adjusted in the arms of the wheel so that they will all bear upon the face of the valve-seat to be operated upon. The yoke $f$ is then loosened so that it will slide freely on the rods $b$, and the device is then placed on the end of a valve from which the cap has been removed, with the jaw $e$ on the fixed head $c$ in contact with one side of the end of the valve, the lengthwise dimension of the device being substantially parallel with the passage through the valve. The head $a$ is then moved up into contact with the opposite side and the yoke $f$ moved along toward the head $a$ until the end of the screw $o$ comes to a bearing on the jaw $d$, as described. This screw $o$ is then turned up to clamp the end of the valve between the jaws $d$ and $e$. This being accomplished, the sliding carriage $k$ is secured in such position, either on the movable head $a$ or the fixed head $c$, as will locate the arm $t$ in substantial parallelism with the face of the valve-seat with the cutters bearing on the latter. The arm $p'$ may then be adjusted in the manner described by the screw $p^2$ to cause the cutters on the wheel 5 to bear against the face of one of the valve-seats B with as much force as desired. The wheel 5 may now be rotated by the means described to face off the valve-seat B, the screw $p^2$ being turned up as required to hold the cutters up to their work. One of the seats having thus been dressed off, the carriage $k$ is removed from, say, the movable head $a$, on which it is shown mounted in Fig. 1, and is mounted on the head $c$ in a reversed position to bring the cutters on the wheel 5 into operative relation to the opposite valve-seat, the carriage $k$ being slid along until the rod $t$ is located in substantial parallelism to the face of the valve-seat, the carriage being then secured by the bolts $m$, and the second seat may then be faced off in the same manner as the first. Small valves can generally be made tight by making a light cut on the valve-seat in the manner described, and, if necessary, the gate or plug can be dressed off in another machine.

By the provision of the means herein described, whereby the stud $v$, on which the star-wheel 5 is mounted, may be easily removed from the end of the arm $t$, cutter-wheels of different diameters may be secured to said arm $t$ to adapt the use of the reseating device to valves having seats of varying diameters, thus providing a greater range of utility than would be possible if this range were limited to the adjustment of the cutters 7 in the arms of said wheel.

Having thus described my invention, what I claim, and desire to secure by Letters Patent of the United States, is—

1. A valve-reseating device comprising a fixed head and a movable head; means on said heads to clamp the end of a valve-body, and a device to force said movable head toward said fixed head; a carriage, and means to support the same on either of said heads, an arm mounted on the carriage to swing in a plane perpendicular to the movement of the latter; a second arm supported in the end of the first-named arm, a cutter-wheel on said second arm, and means to adjust the first-named arm to hold the cutter-wheel against a valve-seat.

2. A valve-reseating device comprising a fixed head and two parallel rods extending from one side thereof; a movable head slidable on said rods, and a movable yoke on said rods beyond the movable head, means to secure said yoke adjustably on the rods, a screw in the yoke to bear against the movable head, a carriage, and means to secure the same on either of the heads interchangeably, an arm supported on said carriage to swing in a plane perpendicular to the movement of the latter, a second arm adjustably supported in one end of the first-named arm at right angles thereto, and an adjusting-screw in the opposite end of said first-named arm, the end of the screw bearing on the carriage, a cutter-wheel in one end of the second-named arm and connected therewith by a universal joint, means on said second-named arm to rotate the cutter-wheel, and clamping-jaws on the fixed and movable heads whereby the device may be secured to a valve.

THOMAS B. WILLIAMS.

Witnesses:
 WM. H. CHAPIN,
 K. I. CLEMONS.